United States Patent [19]

Leung et al.

[11] Patent Number: 5,244,720
[45] Date of Patent: Sep. 14, 1993

[54] FIBER-REINFORCED GLASS COMPOSITE FOR PROTECTING POLYMERIC SUBSTRATES

[75] Inventors: Roger Y. Leung, Schaumburg; Stephen T. Gonczy, Mt. Prospect; Donald E. Yuhas, Glen Ellyn; David P. Groppi, Mt. Prospect, all of Ill.

[73] Assignee: Allied-Signal Inc., Morris Township, Morris County, N.J.

[21] Appl. No.: 689,590

[22] Filed: Apr. 19, 1991

[51] Int. Cl.$^5$ .............................................. D03D 3/00
[52] U.S. Cl. .................... 428/266; 428/245; 428/246; 428/273; 428/285; 428/224; 428/408; 428/447; 428/902; 156/89; 156/155; 156/296
[58] Field of Search ................ 156/89, 155; 428/224, 428/245, 246, 273, 285, 266

[56] References Cited

U.S. PATENT DOCUMENTS

| | | | |
|---|---|---|---|
| 3,944,519 | 3/1976 | Mink et al. | 260/46.5 |
| 4,234,713 | 11/1980 | LeGrow | 528/15 |
| 4,460,638 | 7/1984 | Haluska | 428/224 |
| 4,460,639 | 7/1984 | Chi et al. | 428/224 |
| 4,460,640 | 7/1984 | Chi et al. | 428/224 |

OTHER PUBLICATIONS

Prewo et al., "Fiber Reinforced Glasses and Glass-Ceramics for High Performance Applications", Ceramic Bulletin, vol. 65, No. 2 (1986) pp. 305-313.

*Primary Examiner*—Patrick J. Ryan
*Assistant Examiner*—Richard Weisberger
*Attorney, Agent, or Firm*—Harold N. Wells; Gerhard H. Fuchs; Mary Jo Boldingh

[57] ABSTRACT

A protective layer for polymeric composite substrates comprises a fiber-reinforced glass composite having a refractory fiber in a matrix of a black glass ceramic having the empirical formula $SiC_xO_y$ where x ranges from about 0.5 to about 2.0, preferably 0.9 to 1.6 and y ranges from about 0.5 to 3.0, preferably 0.7 to 1.8. The black glass ceramic is derived from cyclosiloxane monomers containing a vinyl group attached to silicon and/or a hydride-silicon group.

9 Claims, No Drawings

FIBER-REINFORCED GLASS COMPOSITE FOR PROTECTING POLYMERIC SUBSTRATES

PRIOR ART

The invention relates generally to composites in which a matrix material is reinforced with fibers and applied as a protective layer to polymeric substrates.

Polymers are commonly reinforced with fibers and the resulting composites are widely used for many purposes where lightweight, high strength and ease of fabrication are needed. However, polymers are useful at low temperatures, typically being limited to applications where they are exposed to temperatures no higher than about 400° C. For many polymers the temperatures cannot exceed 250° C. Extending the usefulness of such polymeric composites into higher temperature uses would be most desirable.

It has now been found that adding a unique fiber-reinforced composite as a protective layer to polymeric substrates provides substantial resistance for short-term exposure to quite high temperatures.

Matrices having enhanced performance have been suggested for use with fibers having high strength at elevated temperatures. Examples of such matrix materials are the glass and glass ceramics (Prewo et al., Ceramic Bulletin, Vol. 65, No. 2, 1986).

In U.S. Ser. No. 002,049 a ceramic composition designated "black glass" is disclosed which has an empirical formula $SiC_xO_y$ where x ranges from 0.5 to about 2.0 and y ranges from about 0.5 to about 3.0, preferably x ranges from 0.9 to 1.6 and y ranges from 0.7–1.8. Such a ceramic material has a higher carbon content than prior art materials and is very resistant to high temperatures—up to about 1400° C. This black glass material is produced by reacting in the presence of a hydrosilylation catalyst a cyclosiloxane having a vinyl group with a cyclosiloxane having a hydrogen group to form a polymer, which is subsequently pyrolyzed to black glass. The present invention involves the application of such black glass with reinforcing fibers to form a protective layer for polymeric substrates.

In U.S. Pat. No. 4,460,638 a fiber-reinforced glass composite is disclosed which employs high modulus fibers in a matrix of a pyrolyzed silazane polymer. Another possible matrix material is the resin sol of an organosilsesquioxane, as described in U.S. Pat. No. 4,460,639. However, such materials are hydrolyzed, and since they release alcohols and contain excess water, they must be carefully dried to avoid fissures in the curing process.

Another U.S. Pat. No. 4,460,640, disclosed related fiber-reinforced glass composites using organopolysiloxane resins of U.S. Pat. No. 3,944,519 and U.S. Pat. No. 4,234,713 which employ crosslinking by the reaction of ≡SiH groups to $CH_2$=CHSi≡ groups. These later two patents have in common the use of organosilsesquioxanes having $C_6H_5SiO_{3/2}$ units, which have been considered necessary by the patentees to achieve a flowable resin capable of forming a laminate. A disadvantage of such $C_6H_5SiO_{3/2}$ units is their tendency to produce free carbon when pyrolyzed. The present invention requires no such $C_6H_5SiO_{3/2}$ units and still provides a flowable resin, and does not produce easily oxidized carbon.

Another disadvantage of the organopolysiloxanes used in the '640 patent is their sensitivity to water as indicated in the requirement that the solvent used be essentially water-free. The resins contain silanol groups and when these are hydrolyzed they form an infusible and insoluble gel. The present invention requires no such silanol groups and is thus insensitive to the presence of water. In addition, the organopolysiloxanes of the '640 patent may not have a long shelf life while those of the present invention remain stable for extended periods. Still another disadvantage for the organopolysiloxanes disclosed in the '640 patent is that they require a partial curing step before pressing and final curing. This operation is difficult to carry out and may prevent satisfactory lamination if the polymer is over cured. The present invention can be carried out after coating the fibers and requires no pre-curing step.

SUMMARY OF THE INVENTION

A protective layer for polymeric substrates is a fiber-reinforced glass composite comprising (a) at least one refractory fiber selected from the group consisting of boron, silicon carbide, graphite, silica, quartz, S-glass, E-glass, alumina, aluminosilicate, boron nitride, silicon nitride, silicon carbonitride, silicon oxycarbonitride, boron carbide, titanium boride, titanium carbide, zirconium oxide, and zirconia-toughened alumina and, (b) a carbon-containing black glass ceramic composition having the empirical formula $SiC_xO_y$ where x ranges from about 0.5 to about 2.0, preferably from 0.9 to 1.6, and y ranges from about 0.5 to about 3.0, preferably from 0.7 to 1.8. The fibers optionally may be coated with carbon, boron nitride or other coatings to affect the bond between the fiber and the black glass matrix.

In a preferred embodiment, the black glass ceramic composition (b) is the pyrolyzed reaction product of a polymer prepared from (1) a cyclosiloxane monomer having the formula

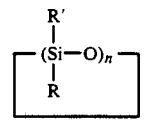

where n is an integer from 3 to about 30, R is hydrogen, and R' is an alkene of from 2 to about 20 carbon atoms in which one vinyl carbon atom is directly bonded to silicon or (2) two or more different cyclosiloxane monomers having the formula of (1) where for at least one monomer R is hydrogen and R' is an alkyl group having from 1 to about 20 carbon atoms and for the other monomers R is an alkene from about 2 to about 20 carbon atoms in which one vinyl carbon is directly bonded to silicon and R' is an alkyl group of from 1 to about 20 carbon atoms, or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said polymerization reaction taking place in the presence of an effective amount of hydrosilylation catalyst. The polymer product is pyrolyzed at a temperature in the range of about 800° C. to about 1400° C. to produce the black glass ceramic, preferably in a non-oxidizing atmosphere.

In another embodiment the invention comprises a method of applying a fiber-reinforced black glass matrix composite wherein the cyclosiloxane reaction product described above is combined with refractory fibers, which may be in the form of woven fabric or unidirectionally aligned fibers. Plies of the resin impregnated fibers may be laid-up to form a green laminate and then pyrolyzed at a temperature between about 800° C. and about 1400° C., preferably about 850° C., to form the black glass composite. The composite may be reimpregnated with precursor and repyrolyzed in order to increase density. The resulting black glass composite is then applied to an uncured polymer laminate and cured using heat and pressure suitable for the polymer selected in order to bond the two components into a composite capable of withstanding higher temperatures than possible with the polymer alone. A curable bonding agent may be used as an intermediate layer to assist in bonding the two layers.

The polymeric substrate may be glass fiber, organic fiber, or carbon fiber-reinforced organic matrices, such as epoxy, bismaleimides, phenolic triazines, poly(phenylene sulfide), poly(etheretherketone), poly(ethersulfone), liquid crystal polymers, phenolics, PMR polyimides, and the like.

DESCRIPTION OF THE PREFERRED EMBODIMENTS

Black Glass Ceramic

The black glass ceramic used as the matrix has an empirical formula $SiC_xO_y$ wherein x ranges from about 0.5 to about 2.0, preferably 0.9–1.6, and y ranges from about 0.5 to about 3.0, preferably 0.7–1.8, whereby the carbon content ranges from about 10% to about 40% by weight. The black glass ceramic is the product of the pyrolysis, preferably in a non-oxidizing atmosphere, at temperatures between about 800° C. and about 1400° C. of a polymer made from certain siloxane monomers.

The polymer precursor of the black glass ceramic may be prepared by subjecting a mixture containing cyclosiloxanes of from 3 to 30 silicon atoms to a temperature in the range of from about 10° C. to about 300° C. in the presence of 1–200 wt. ppm of a platinum hydrosilylation catalyst for a time in the range of from about 1 minute to about 600 minutes. When the polymer is pyrolyzed at a temperature in the range from about 800° C. to about 1400° C. for a time in the range of from about 1 hour to about 300 hours, black glass results. The polymer formation takes advantage of the fact that a silicon-hydride will react with a silicon-vinyl group to form a silicon-carbon-carbon-silicon bonded chain, thereby forming a network polymer. For this reason, each monomer cyclosiloxane must contain either a silicon-hydride bond or a silicon-vinyl bond or both. A silicon-hydride bond refers to a silicon atom bonded directly to a hydrogen atom and a silicon-vinyl bond refers to a silicon atom bonded directly to an alkene carbon, i.e., it is connected to another carbon atom by a double bond.

The polymer precursor for the black glass ceramic may be defined generally as the reaction product of (1) a cyclosiloxane monomer having the formula

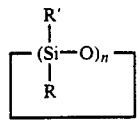

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 20 carbon atoms and for the other monomers R is an alkene from about 2 to 20 carbon atoms in which one vinyl carbon is directly bonded to silicon and R' is an alkyl group of from 1 to 20 carbon atoms, or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said reaction taking place in the presence of an effective amount of hydrosilylation catalyst.

The black glass ceramic may be prepared from a cyclosiloxane polymer precursor wherein both the requisite silicon-hydride bond and the silicon-vinyl bond are present in one molecule, for example, 1,3,5,7-tetravinyl-1,3,5,7-tetrahydro-cyclotetrasiloxane. Such monomers may also contain alkyl groups such as, for example, 1,3-divinyl-1,5-dihydro-3,5,7,7-tetramethylcyclotetrasiloxane. Alternatively, two or more cyclosiloxane monomers may be polymerized. Such monomers would contain at least either a silicon hydride bond or a silicon-vinyl bond and the ratio of the two types of bonds should be about 1:1, more broadly about 1:9 to 9:1.

Examples of such cyclosiloxanes include, but are not limited to:

1,3,5,7-tetramethyltetrahydrocyclotetrasiloxane,
1,3,5,7-tetravinyltetrahydrocyclotetrasiloxane,
1,3,5,7-tetravinyltetraethylcyclotetrasiloxane,
1,3,5,7-tetravinyltetramethylcyclotetrasiloxane,
1,3,5-trimethyltrivinylcyclotrisiloxane,
1,3,5-trivinyltrihydrocyclotrisiloxane,
1,3,5-trimethyltrihydrocyclotrisiloxane,
1,3,5,7,9-pentavinylpentahydrocyclopentasiloxane,
1,3,5,7,9-pentavinylpentamethylcyclopentasiloxane,
1,1,3,3,5,5,7,7-octavinylcyclotetrasiloxane,
1,1,3,3,5,5,7,7-octahydrocyclotetrasiloxane,
1,3,5,7,9,11-hexavinylhexamethylcyclohexasiloxane,
1,3,5,7,9,11-hexamethylhexahydrocyclohexasiloxane,
1,3,5,7,9,11,13,15,17,19-decavinyldecahydrocyclodecasiloxane,
1,3-divinyl-1,5-dihydro-3,5,7,7-tetramethylcyclotetrasiloxane
1,3,5-trivinyl-1,3.5,7,7-pentamethylcyclotetrasiloxane
1,3,5-trihydro-1,3,5,7,7-pentamethylcyclotetrasiloxane
1,3,5,7,9,11,13,15,17,19,21,23,25,27,29-pentadecavinyl-1,3,5,7,9,11,13,15,17,19,21,23,25,27,29-pentadecahydrocyclopentadecasiloxane
1,3,5,7-tetrapropenyltetrahydrocyclotetrasiloxane,
1,3,5,7-tetrapentenyltetrapentylcyclotetrasiloxane and
1,3,5,7,9-pentadecenylpentapropylcyclopentasiloxane.

It will be understood by those skilled in the art that while the siloxane monomers may be pure species, it will be frequently desirable to use mixtures of such monomers, in which a single species is predominant. Mixtures in which the tetramers predominate have been found particularly useful.

While the reaction works best if platinum is the hydrosilylation catalyst, other catalysts such as cobalt, rhodium (Wilkinson's catalyst) and manganese carbonyl will perform adequately. The catalyst can be dispersed as a solid or can be used as a solution when added to the cyclosiloxane monomer. With platinum, about 1 to 200 wt. ppm, preferably 1 to 50 wt. ppm as the metal will be employed as the catalyst.

Black glass precursor polymer may be prepared from either bulk or solution polymerization. In bulk polymerization, neat monomer liquid, i.e., without solvents, reacts to form oligomers or high molecular weight polymers. In bulk polymerization, a solid gel can be formed without entrapping solvent. It is particularly useful for impregnating porous composites to increase density. Solution polymerization refers to polymerizing monomers in the presence of an unreactive solvent.

The resin used in impregnating fibers to form prepreg in our invention preferably is prepared by solution polymerization. The advantage of solution polymerization is the ease of controlling resin characteristics. It is possible but very difficult to produce B-stage resin suitable for prepregs with consistent characteristics by bulk polymerization. In the present invention, soluble resin with the desirable viscosity, tackiness, and flowability suitable for prepregging and laminating can be obtained consistently using solution polymerization process. The production of easily handleable and consistent resin is very critical in composite fabrication.

Fibers

Reinforcing fibers useful in the protective layers of the invention are refractory fibers which are of interest for applications where superior physical properties are needed. They include such materials as boron, silicon carbide, graphite, silica, quartz, S-glass, E-glass, alumina, aluminosilicates, boron nitride, silicon carbonitride, silicon oxycarbonitride, silicon nitride, boron carbide, titanium boride, titanium carbide, zirconium oxide, and zirconia-toughened alumina. The fibers may have various sizes and forms. They may be monofilaments from 1 $\mu$m to 200 $\mu$m diameter or tows of 200 to 2000 filaments. When used in composites of the invention they may be woven into fabrics, pressed into mats, or unidirectionally aligned with the fibers oriented as desired to obtain the needed physical properties.

An important factor in the performance of the black glass composites is the bond between the fibers and the black glass matrix. Consequently, where improved mechanical strength and toughness are desired, the fibers are provided with a carbon, boron nitride, or other coating which reduces the bonding between the fibers and the black glass matrix. The surface sizings found on fibers as received or produced may be removed by solvent washing or heat treatment and the coating applied. Various methods of depositing carbon coatings may be used, including chemical vapor deposition, solution coating, and pyrolysis of organic polymers such as carbon pitch and phenolics. One preferred technique is chemical vapor deposition using decomposition of methane or other hydrocarbons. Another method is pyrolysis of an organic polymer coating such as phenol-formaldehyde polymers cross-linked with such agents as the monohydrate or sodium salt of paratoluenesulfonic acid. Still another method uses toluene-soluble and toluene-insoluble carbon pitch to coat the fibers. Deposition of boron nitride may be accomplished by reaction of boron compounds such as boron chloride with ammonia.

Processing

As previously discussed, the black glass precursor is a polymer. It may be shaped into fibers and combined with reinforcing fibers or the black glass precursor may be used in solution for coating or impregnating reinforcing fibers. Various methods will suggest themselves to those skilled in the art for combining the black glass precursor with reinforcing fibers. It would, for example, be feasible to combine fibers of the polymer with fibers of the reinforcing material and then to coat the resulting fabric or mat. Alternatively, the reinforcing fibers could be coated with a solution of the polymer and then formed into the desired shape. Coating may be done by dipping, spraying, brushing, or the like.

In one method, a continuous fiber is coated with a solution of the black glass precursor polymer and then wound on a rotating drum covered with a release film which is easily separated from the coated fibers. After sufficient fiber has been built up on the drum, the process is stopped and the unidirectional fiber mat removed from the drum and dried. The resulting mat (i.e., "prepreg") then may be cut and laminated into the desired shapes.

In a second method, a woven or pressed fabric of the reinforcing fibers is coated with a solution of the black glass precursor polymer and then dried, after which it may be formed into the desired shapes by procedures which are familiar to those skilled in the art of fabricating structures with the prepreg sheets. For example, layers of prepreg sheets may be laid together, heated and pressed into the needed shape. The orientation of the fibers may be chosen to strengthen the composite part in the principal load-bearing directions.

Solvents for the black glass precursor polymers include hydrocarbons, such as isooctane, toluene, benzene, and xylene, and ethers, such as tetrahydrofuran, and ketones such as methyl ethyl ketone, etc. Concentration of the prepregging solution may vary from about 10% to about 70% of resin by weight. Precursor polymer used in impregnating the fibers is usually prepared from solution polymerization of the respective monomers.

Since the precursor polymers do not contain any hydrolyzable functional groups, such as silanol, chlorosilane, or alkoxysilane, the precursor polymer is not water sensitive. No particular precaution is needed to exclude water from the solvent or to control relative humidity during processing.

The resin ages very slowly when stored at or below room temperatures as is evident from its shelf life of more than three months at these temperatures. The resin is stable both in the solution or in the prepreg. Prepregs stored in a refrigerator for three months have been used to make laminates without any difficulty. Also, resin solutions stored for months have been used for making prepregs successfully.

Large and complex shape fiber-reinforced glass composites can be fabricated from laminating prepregs. One method is hand lay-up. Several plies of prepregs cut to the desired shape are laid-up to achieve the required thickness of the component. Fiber orientation can be tailored to give maximum strength in the preferred direction. Fibers can be oriented unidirectionally [0], at 90° angles [0/90], at 45° angles [0/45 or 45/90], and in other combinations as desired. The laid-up plies are then bonded by vacuum compaction before autoclave curing. Another fabrication method is tape laying which uses pre-impregnated ribbons in forming composites. The resins can be controlled to provide the desired tackiness and viscosity in the prepreg for the lay-up procedures.

After the initial lay-up of the prepregs, the composites are consolidated and cured by heating to temperatures up to about 250° C. under pressure. In one method, the composited prepreg is placed in a bag, which is then evacuated and the outside of the bag placed under a pressure sufficient to bond the layered prepreg, say up to about 1482 kPa. The resin can flow into and fill up any voids between the fibers, forming a void-free green laminate skin. The resulting polymer-fiber composite is dense and is ready for conversion of the polymer to black glass ceramic. If an excessively cured prepreg is used, as is possible with the method of U.S. Pat. No. 4,460,640, there will be no adhesion between the plies and no flow of resin material and no bonding will occur.

Heating the composite to temperatures from about 800° C. up to about 1400° C. (pyrolysis) converts the polymer into a black glass ceramic containing essentially only carbon, silicon, and oxygen. Pyrolysis is preferably carried out in an inert atmosphere, although oxygen may be present provided the heating is carried out very rapidly, as discussed in co-pending application having a Ser. No. 07/863,481. It is characteristic of the black glass prepared by pyrolyzing the cyclosiloxanes described above that the resulting black glass has a large carbon content, but is able to withstand exposure to temperatures up to about 1400° C. in air without oxidizing to a significant degree. Pyrolysis is usually carried out with a heating to the maximum temperature selected, holding at that temperature for a period of time determined by the size of the structure, and then cooling to room temperature. Little bulk shrinkage is observed for the black glass composites and the resulting structure typically has about 70-80% of its theoretical density.

Conversion of the polymer to black glass takes place between 430° C. and 950° C. Three major pyrolysis steps were identified by thermogravimetric analysis at 430° C.-700° C., 680° C.-800° C. and 780° C.-950° C. The yield of the polymer-glass conversion up to 800° C. is about 83%; the third pyrolysis mechanism occurring between 780° C. and 950° C. contributed a final 2.5% weight loss to the final product.

Since the pyrolyzed composite structure still retains voids, the structure may be increased in density by impregnating with a neat monomer liquid or solution of the black glass precursor polymer. The solution is then gelled by heating to about 50° C.-120° C. for a sufficient period of time. Following gelation, the polymer is pyrolyzed as described above. Repeating these steps, it is feasible to increase the density up to about 95% of the theoretical. Alternatively, a porosity suitable for bonding to the polymer substrate may be produced.

Polymeric Substrates

The polymeric substrates may include a wide variety of polymers used as matrices for reinforcing fibers, which in this class of materials are typically glass or carbon fibers, although other fibers such as those used in the black glass composites or organic fibers such as polyester, nylon, Spectra®, polyethylene, aromatic polyamide (e.g. Kevlar®), polybenzoxazole, and poly(etheretherketone) may be chosen if desired. Polymers which might be used as matrices include epoxy, bismaleimides, phenolic triazines, poly(phenylene sulfide), poly(etheretherketone), poly(ether sulfone), liquid crystal polymers, phenolics, PMR polyimides, polyurethanes, silicones, polycarbonate, polyamide-amide and the like. In general, there is believed to be no limitation on the nature of the polymer substrates. The polymeric substrates are protected by applying a pyrolyzed fiber-reinforced black glass layer to B stage or partially cured polymer substrate and then curing the polymer, which also bonds the cured polymer substrate to the protective layer of reinforced black glass matrix.

Several methods familiar to those skilled in the art are useful for bonding the polymer substrate to the black glass layer. In one method the black glass layer is bonded to the polymer substrate by using heat and pressure. In another method a curable bonding agent is applied as an intermediate layer and cured. A third method is similar to the first but the polymer is applied as a fiber-reinforced prepreg to the black glass layer and then the two are vacuum autoclaved, autoclave cured, or hot-pressed to consolidate the layers and to cause the polymer to flow into pores of the black glass layer. The conditions for such curing will depend upon the polymer selected and the degree to which the polymer has been given a partial cure before contacting the reinforced black glass composite.

EXAMPLE 1

Polymer Precursor Preparation

The cyclosiloxane having silicon-vinyl bond was poly(vinylmethylcyclosiloxane) (ViSi). The cyclosiloxane with a silicon-hydride bond was poly(methylhydrocyclosiloxane) (HSi). Both cyclosiloxanes were mixtures of oligomers, about 85% by weight being the cyclotetramer with the remainder being principally the cyclopentamer and cyclohexamer. A volume ratio of 59 ViSi/41 HSi was mixed with 22 wt. ppm of platinum as a platinum-cyclovinylmethylsiloxane complex in isooctane to give a 10 vol. percent solution of the cyclosiloxane monomers. The solution was heated to reflux conditions (about 100° C.) and refluxed for about 1 hour. Then, the solution was concentrated in a rotary evaporator at 50° C. to a 25-35% concentration suitable for use in prepregging. The resin produced was poly(methylmethylenecyclosiloxane) (PMMCS). It was tacky at room temperature and flowable at temperatures of about 70° C. or higher and thus suitable for use as a B-stage resin.

EXAMPLE 2

A black glass composite layer was prepared by applying a 35 wt. % solution of the black glass precursor polymers of Example 1 in isooctane to 6"×6" (152.4 mm×152.4 mm) squares of a carbon coated Nicalon ® unidirectional fiber fabric, six layers of which were laid up with [0/90] orientation. This prepreg was cured in an autoclave by heating to 65° C. at 2° C./min, holding for 30 minutes, then heating to 135° C. at 2° C./min, holding for 30 minutes, and then cooling to room temperature at 2° C./min. No weight loss was found. The cured composite was next pyrolyzed by heating in a furnace in a nitrogen atmosphere to 350° C. over 2.7 hours, holding for 10 minutes and then heating to 450° C. over 2.7 hours, holding again for 10 minutes and then heating to 850° C. over 6.7 hours, holding for 10 minutes and cooling down to 200° C. over 5 hours. After the pyrolyzed composite was free cooled to room temperature the black glass composite was infiltrated three times with a neat solution of ViSi/HSi cyclosiloxane in a ratio of 59 to 41 in the presence of 22 wt. ppm of platinum. After such application of the precursor solution, the black glass composite was heated to 50° C. to cure the infiltrated liquid and then pyrolyzed as described. The weight of the consolidated composite initially was 55.41 gms. It decreased to 52.74 gm after pyrolysis and then increased with the subsequent additions of black glass precursors to 67.14 gms, 72.1 gms, and finally 76.39 gms, respectively, after the pyrolysis.

The polymeric substrate selected was a Magnamite® AS4/3501-6 unidirectional graphite fiber-reinforced epoxy resin obtained from Hercules. The epoxy resin is stated to be stable up to 177° C. and makes up 30% of the weight of the prepreg. Twelve layers of 6"×6" (152.4 mm×152.4 mm) squares of the Magnamite prepreg were laid up in a [0/90] orientation. Then, the black glass composite described above was placed on top of the epoxy prepreg layers with the fibers in contacting layers oriented in the same direction. The composite was then placed in a vacuum bag and a vacuum applied of 28 in (711 mm) of mercury. The bag was heated to 116° C. at 2.8° C./min in an autoclave at 85 psig (586 kPa gauge), then after holding for 60 minutes, the temperature was raised to 177° C. at 2.8° C./min and 100 psig (689.5 kPa gauge) while venting the vacuum bag to atmospheric pressure. The temperature was reduced to 116° C. and held there for 120 minutes, after which it was cooled to 93° C. at 2.8° C./minute. The pressure was released and the composite allowed to free cool to room temperature. The initial weight was 138.75 gms, but after curing the weight was 129.06 gms, of which 76.39 gms represented the black glass-Nicalon composite and 52.67 gms represented the epoxy-carbon composite. Of the combined composites black glass was 28.7 wt. %, Nicalon 30.5 wt. %, epoxy 9.4 wt. %, and carbon 31.4 wt. %.

A control laminate was prepared with only twelve plies of Magnamite AS4/3501-6 as described above, but without applying a black glass-Nicalon layer.

EXAMPLE 3

The composites prepared in Example 3 were cut into 3"×3" (76.2 mm×76.2 mm) samples for testing for flame resistance when contacted with the flame from a 0.5" (12.7 mm) Bunsen burner fueled by natural gas and adjusted to provide temperatures of about 480°–530° C. and 380°–420° C. The flame covered an area about 1.3" (33 mm) in diameter in the middle of each sample. When heating the hybrid composites, the flame impinged on the black glass side. The results of comparisons between the epoxy laminate and the black glass-epoxy composites are given in the following table.

TABLE 1

| Test No. | Sample | Flame Temp, °C. | Time, sec. | Results | Weight Change |
|---|---|---|---|---|---|
| A | Black glass/ epoxy hybrid composite | 534 | 158 | No burning | −0.3% |
|  | Epoxy (control) composite | 506 | 135 | Burned and smoked after 55 sec., all epoxy consumed in flame area in 120 sec. | −1.8% |
| B | Black glass/ epoxy hybrid composite | 400 | 420 | No burning after 7 minutes. no scorch mark | −0.1% |

TABLE 1-continued

| Test No. | Sample | Flame Temp, °C. | Time, sec. | Results | Weight Change |
|---|---|---|---|---|---|
|  | Epoxy (control) composite | 390 | 420 | No burning. Delamination occurred, scorch mark | −0.1% |

EXAMPLE 4

The samples were cut into 3"×0.5 (76.2 mm×12.7 mm) test bars after the flame testing of Example 3. Three bars were tested from each sample. One from the center of each sample where the flame had touched and one each from either side of the center piece. A 3-point bend test was done in an Instron tester to determine the effect of flame contact on the strength of the laminates. The results of the tests are given in the following table.

TABLE 2

| Sample | Flame Exposure, °C. | Time | Bend Strength, Ksi (MPa) |
|---|---|---|---|
| Epoxy Composite (control) (as-prepared) | N/A | N/A | 181 (1248) |
| Epoxy Composite (control) (flame exposed) | 390 | 7 min. | Center 29 (200) Left 159 (1096) Right 47 (324) |
| Epoxy Composite (Control) (flame exposed) | 506 | 135 sec | Center 5 (34.5) Left 33 (227.5) Right 8 (55.2) |
| Black glass/ epoxy Composite (invention) (as prepared) | N/A | N/A | 60 (414) |
| Black glass/ epoxy Composite (invention) (flame exposed) | 400 | 7 min. | Center 47 (324) Side 60 (414) |
| Black glass/ epoxy Composite (invention) (flame exposed) | 534 | 158 min. | Center 23 (159) Left 51 (352) Right 38 (262) |

It will be seen that the black glass-epoxy composite retained much of its initial strength while the strength of the epoxy composite control was significantly reduced even at the low temperature exposure where no burning occurred. Consequently, it is concluded that the black glass covered epoxy laminate can be used above temperature range normally permitted for the epoxy alone.

We claim:

1. A fiber-reinforced polymeric substrate having as a protective layer a fiber-reinforced glass composite wherein said fiber-reinforced glass composite comprises (a) at least one refractory fiber selected from the group consisting of boron, silicon carbide, graphite, silica, quartz, S-glass, E-glass, alumina, aluminosilicate, boron nitride, silicon nitride, silicon carbonitride, silicon oxycarbonitride, boron carbide, titanium boride, titanium carbide, zirconium oxide, and zirconia-toughened alumina and, (b) a carbon-containing black glass ceramic composition having the empirical formula $SiC_xO_y$ where x ranges from about 0.5 to about 2.0, and y ranges from about 0.5 to about 3.0 which is the pyrolyzed reaction product of a polymer prepared from (1) a cyclosiloxane monomer having the formula

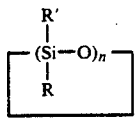

where n is an integer from 3 to about 30, R is hydrogen, and R' is an alkene of from 2 to about 20 carbon atoms in which one vinyl carbon atom is directly bonded to silicon or (2) two or more different cyclosiloxane monomers having the formula of (1) where for at least one monomer R is hydrogen and R' is an alkyl group having from 1 to about 20 carbon atoms and for the other monomers R is an alkene from about 2 to about 20 carbon atoms in which one vinyl carbon is directly bonded to silicon and R' is an alkyl group of from 1 to about 20 carbon atoms, or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said polymerization reaction taking place in the presence of an effective amount of hydrosilylation catalyst.

2. A fiber-reinforced polymeric substrate having as a protective layer a fiber-reinforced glass composite applied by
(a) reacting (1) a cyclosiloxane monomer having the formula

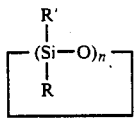

where n is an integer from 3 to 30, R is hydrogen, and R' is an alkene of from 2 to 20 carbon atoms in which one vinyl carbon atom is directly bonded to silicon or (2) two or more different cyclosiloxane monomers having the formula of (1) where for at least one monomer R is hydrogen and R' is an alkyl group having from 1 to 20 carbon atoms and for the other monomers R is an alkene from 2 to 20 carbon atoms in which one vinyl carbon is directly bonded to silicon and R' is an alkyl group of from 1 to about 20 carbon atoms, or (3) cyclosiloxane monomers having the formula of (1) where R and R' are independently selected from hydrogen, an alkene of from 2 to about 20 carbon atoms in which one vinyl carbon atom is directly bonded to silicon, or an alkyl group of from 1 to about 20 carbon atoms and at least some of said monomers contain each of said hydrogen, alkene, and alkyl moieties, said reaction taking place in the presence of an effective amount of hydrosilylation catalyst;

(b) applying the reaction product of (a) to at least one refractory fiber selected from the group consisting of boron, silicon carbide, graphite, silica, quartz, S-glass, E-glass, alumina, aluminosilicate, boron nitride, silicon nitride, silicon carbonitride, silicon oxycarbonitride, boron carbide, titanium boride, titanium carbide, zirconium oxide, and zirconia-toughened alumina to form a prepreg;

(c) laying-up plies of the prepreg of (b) to form a prepreg;

(d) curing the prepreg of (c) at a temperature not greater than 250° C.;

(e) pyrolyzing the cured prepreg of (d) at a temperature of about 800° C. to about 1400° C.;

(f) recovering the pyrolyzed product of (e) as the fiber-reinforced glass composite;

(g) forming a partially cured fiber-reinforced polymeric matrix laminate;

(h) combining the laminate of (g) with the pyrolyzed product of (e);

(i) curing the combined laminate-pyrolyzed product of (h) at curing conditions and recovering the cured product.

3. The polymeric substrate having a protective layer of claim 2 wherein the application method further comprises the steps of
(f') impregnating the pyrolyzed product (f) with the reaction product of (a);
(f'') pyrolyzing the impregnated product of (f') at 800° C.-1400° C.;
(f''') repeating steps (f') and (f'') to further increase the density of said fiber-reinforced glass composite.

4. The polymeric substrate having a protective layer of claim 2 wherein the combined laminate and pyrolyzed product of (h) are cured by heat and pressure.

5. The polymeric substrate having a protective layer of claim 2 wherein the laminate of (g) and the pyrolyzed product of (e) are bonded by an intermediate curable bonding agent.

6. The polymeric substrate having a protective layer of claim 2 wherein the laminate of (g) is formed by laying up prepreg layers of fiber-reinforced polymer on the pyrolyzed product of (e).

7. The polymeric substrate having a protective layer of claim 2 wherein said pyrolysis of (e) is carried out in a non-oxidizing atmosphere.

8. The polymeric substrate having a protective layer of claim 2 wherein the reinforcing fiber of the laminate of (g) is selected from the group consisting of glass, carbon, nylon, polyester, polyethylene, polyamide, polybenzoxazole, and poly(etheretherketone).

9. The polymeric substrate having a protective layer of claim 2 wherein the polymer matrix of the laminate of (g) is selected from the group consisting of epoxy, bismaleimides, phenolic triazines, poly(phenylenesulfide), poly(etheretherketone), poly(ethersulfone), polyimides, polyurethanes, silicones, polycarbonate, and poly amide-amide.

* * * * *